United States Patent [19]
Prasad et al.

[11] 3,855,205
[45] Dec. 17, 1974

[54] PROCESS FOR PREPARING ADENOSINE-5'-CARBOXYLATES

[75] Inventors: Raj Nandan Prasad, Pierrefonds, Quebec, Canada; Francis Elmer Fischer, Waukegan, Ill.

[73] Assignee: Abbott Laboratories, Chicago, Ill.

[22] Filed: Oct. 3, 1972

[21] Appl. No.: 294,699

[52] U.S. Cl. .......................... 260/211.5 R
[51] Int. Cl. ............................ C07d 51/54
[58] Field of Search ............ 260/211.5 R, 234 R

[56] References Cited
UNITED STATES PATENTS
2,628,249   2/1953   Bruno ...................... 260/234 R
3,023,183   2/1962   Nelson ..................... 260/234 R
3,697,504   10/1972  Schmidt .................... 260/234

Primary Examiner—Johnnie R. Brown
Attorney, Agent, or Firm—Robert L. Niblack; Joyce R. Krei; Vincent A. Mallare

[57] ABSTRACT

An improved process for synthesizing esters of adenosine-5'-carboxylic acid comprising reacting the acid with thionyl chloride and an appropriate alcohol at a temperature of less than 0°.

3 Claims, No Drawings

PROCESS FOR PREPARING ADENOSINE-5'-CARBOXYLATES

DETAILED DESCRIPTION OF INVENTION

This invention relates to an improved process for synthesizing esters of adenosine-5'-carboxylic acid of the formula

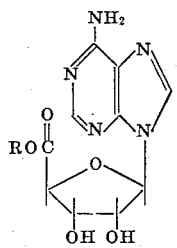

wherein R is loweralkyl, haloloweralkyl, hydroxyloweralkyl, lower cycloalkyl, loweralkenyl, loweralkynyl, loweralkylcycloalkyl, or alkoxyalkyl, and the pharmaceutically acceptable acid addition salts thereof.

The term "loweralkyl" refers to both straight and branched chain $C_1$-$C_6$ alkyls including methyl, ethyl, n-propyl, iso-propyl, n-butyl, sec-butyl, tert-butyl, iso-butyl, n-pentyl, iso-pentyl, neo-pentyl, hexyl and the like.

"Loweralkenyl" refers to the $C_2$-$C_6$ alkyl groups, as defined above, from which a hydrogen atom has been removed from each of two adjacent carbon atoms to produce ethylenic unsaturation; e.g., vinyl, allyl, methallyl, 1-pentenyl and the like.

"Loweralkynyl" refers to the $C_2$-$C_6$ alkyl groups as defined above, from which two hydrogen atoms have been removed from each of two adjacent carbon atoms to produce acetylenic unsaturation; e.g., ethynyl, propargyl, 2-butynyl, 1-pentynyl and the like.

"Halo" includes chloro, fluoro, bromo or iodo.

"Loweralkyl cycloalkyl" includes cyclopropylmethyl, cyclobutylethyl and the like.

The term "alkoxyloweralkyl" refers to alkoxyalkyl groups having no more than six carbon atoms, such as methoxymethyl, ethoxyethyl, methoxyethyl, propoxypropyl, propoxyethyl and the like.

The compounds of the above formula have been reported to be useful intermediates for pharmaceutically active compounds (See German Pat. No. 2,034,784).

The present invention provides a process for preparing the above esters which overcomes the problems of hydrolysis and transesterification encountered in other synthetic routes.

The process of this invention comprises reacting adenosine-5'-carboxylic acid or an acid addition salt thereof with thionyl chloride and the appropriate alcohol (ROH) at a temperature below 0° C. Preferably, the acid is added to an excess of the alcohol and the mixture is cooled to below 0°, preferably −10° to −20°, in, for example, a dry ice-acetone bath. When the desired temperature has been reached, thionyl chloride is added, preferably rapidly, in dropwise fashion, to the mixture. The reaction is allowed to warm to room temperature, preferably for a period of 16 to 24 hours, cooled to about 0° and the resulting solid collected, washed with alcohol and ether and recrystallized from boiling alcohol.

The following examples further illustrate this invention.

EXAMPLE 1

Ethyl Adenosine-5'-Carboxylate Hydrochloride

To 2,500 ml. of absolute ethanol was added 128 g. (0.455M) of adenosine-5'-carboxylic acid. The mixture was cooled to −20° by means of external cooling with a dry ice-acetone bath. Thionyl chloride (166 ml.) was then added dropwise over a 20 minute period. The reaction mixture was stirred and allowed to warm to room temperature overnight. After stirring for 18 hours, the mixture was cooled to 0° and the resulting solid collected on a filter, washed with fresh cold alcohol, washed with ether and air dried to yield 165 g. of crude product as a solid, m.p. 170°–174°. The crude ester was dissolved in 3,900 ml. of boiling alcohol, treated with Darco charcoal and filtered while hot. The filtrate was then cooled in an ice bath and the resulting solid collected on a filter, washed with cold alcohol and then ether. The product was dried in a vacuum oven at 80° C. for 16–18 hours to yield 128.5 g. of the desired product, m.p. 179.5°–180°. The filtrate was concentrated to yield an additional 12.7 g. of product. NMR and TLC ($R_f$ 0.4, n-butanol-water) confirmed the identity of the product.

Analysis Calcd. for $C_{12}H_{15}N_5O_5 \cdot HCl$: C, 41.67; H, 4.63; Cl, 10.27; N, 20.26
Found: C, 41.91; H, 4.91; Cl, 10.07; N, 19.81

The following compounds were made following the method of Example 1 substituting the appropriate alcohol for ethanol.

EXAMPLES 2-12

2-Chloroethyl adenosine-5'-carboxylate, m.p. 208°–210° from adenosine-5'-carboxylic acid and chloroethyl alcohol.

2-Hydroxyethyl adenosine-5'-carboxylate, m.p. 204°–205° from adenosine-5'-carboxylic acid and hydroxyethyl alcohol.

Allyl adenosine-5'-carboxylate, m.p. 210°–211° from adenosine-5'-carboxylic acid and allyl alcohol.

Ethoxyethyl adenosine-5'-carboxylate, m.p. 150°–152° from adenosine-5'-carboxylic acid and ethoxyethyl alcohol.

n-Propyl adenosine-5'-carboxylate, m.p. 198°–200° from adenosine-5'-carboxylic acid and n-propyl alcohol.

iso-Propyl adenosine-5'-carboxylate, m.p. 222°–223° from adenosine-5'-carboxylic acid and iso-propyl alcohol.

n-Butyl adenosine-5'-carboxylate, m.p. 145°–148° from adenosine-5'-carboxylic acid and n-butyl alcohol.

tert-Butyl adenosine-5'-carboxylate, m.p. 179°–181° from adenosine-5'-carboxylic acid and tert-butyl alcohol.

2-Propargyl adenosine-5'-carboxylate, m.p. 185°–187° from adenosine-5'-carboxylic acid and 2-propargyl alcohol.

Cyclopropylmethyl adenosine-5'-carboxylate, m.p. 222°–223°dec., from adenosine-5'-carboxylic acid and cyclopropylmethyl.

Cyclopentyl adenosine-5'-carboxylate, m.p. 228°–232° dec., from adenosine-5'-carboxylic acid and cyclopentyl alcohol.

We claim:

1. A method of synthesizing a compound of the formula

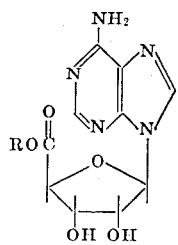

wherein R is loweralkyl, haloloweralkyl, hydroxyloweralkyl, lower cycloalkyl, loweralkenyl, loweralkynyl, loweralkylcycloalkyl or alkoxyalkyl, comprising the steps of reacting adenosine-5'-carboxylic acid with thionyl chloride and an alcohol of the formula ROH wherein R is as defined above at a temperature of from 0° C. to −20° C.

2. The method of claim 1 wherein the adenosine-5'-carboxylic acid is added to an excess of said alcohol, the acidalcohol mixture is cooled to a temperature of from 0° to −20° C, and said thionyl chloride is added to said cooled mixture.

3. The method of claim 2 wherein said reaction mixture is warmed to room temperature for a period of from 16 to 24 hours, cooled to about 0° and the resulting solid product collected.

* * * * *